Jan. 12, 1932.   A. FAURE   1,840,438
AUTOMATIC CONTINUOUS MOLDING MACHINE
Filed Feb. 9, 1931   15 Sheets-Sheet 10
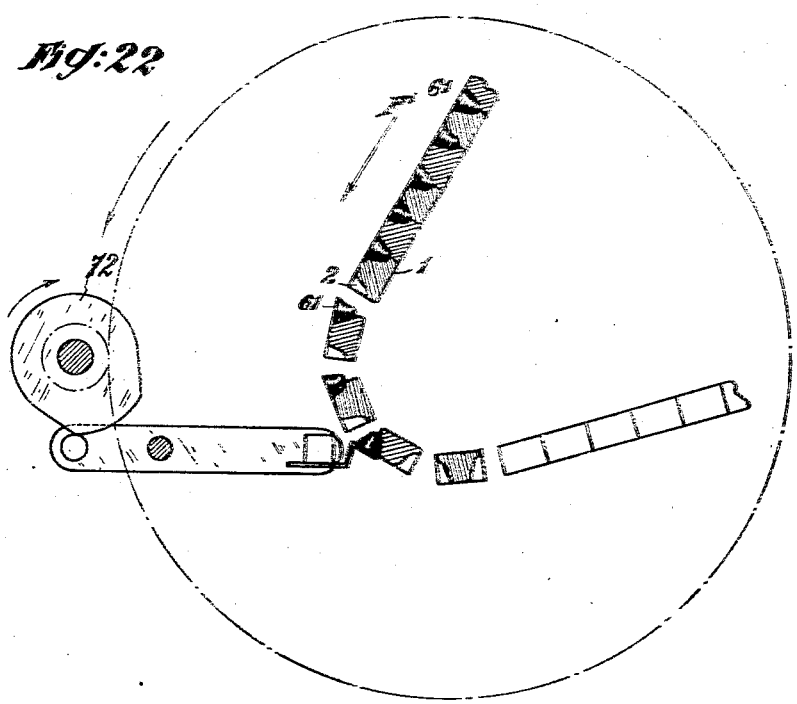
Fig:22
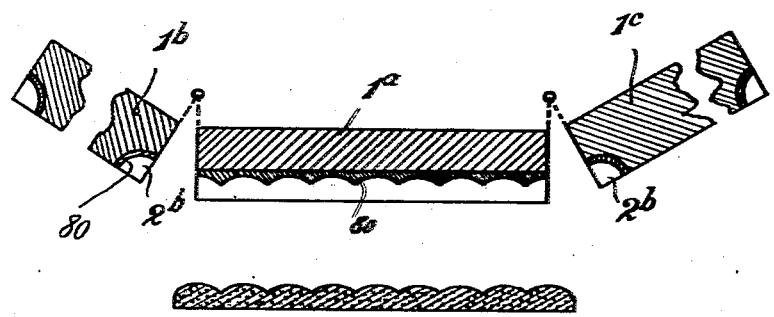
Fig:37

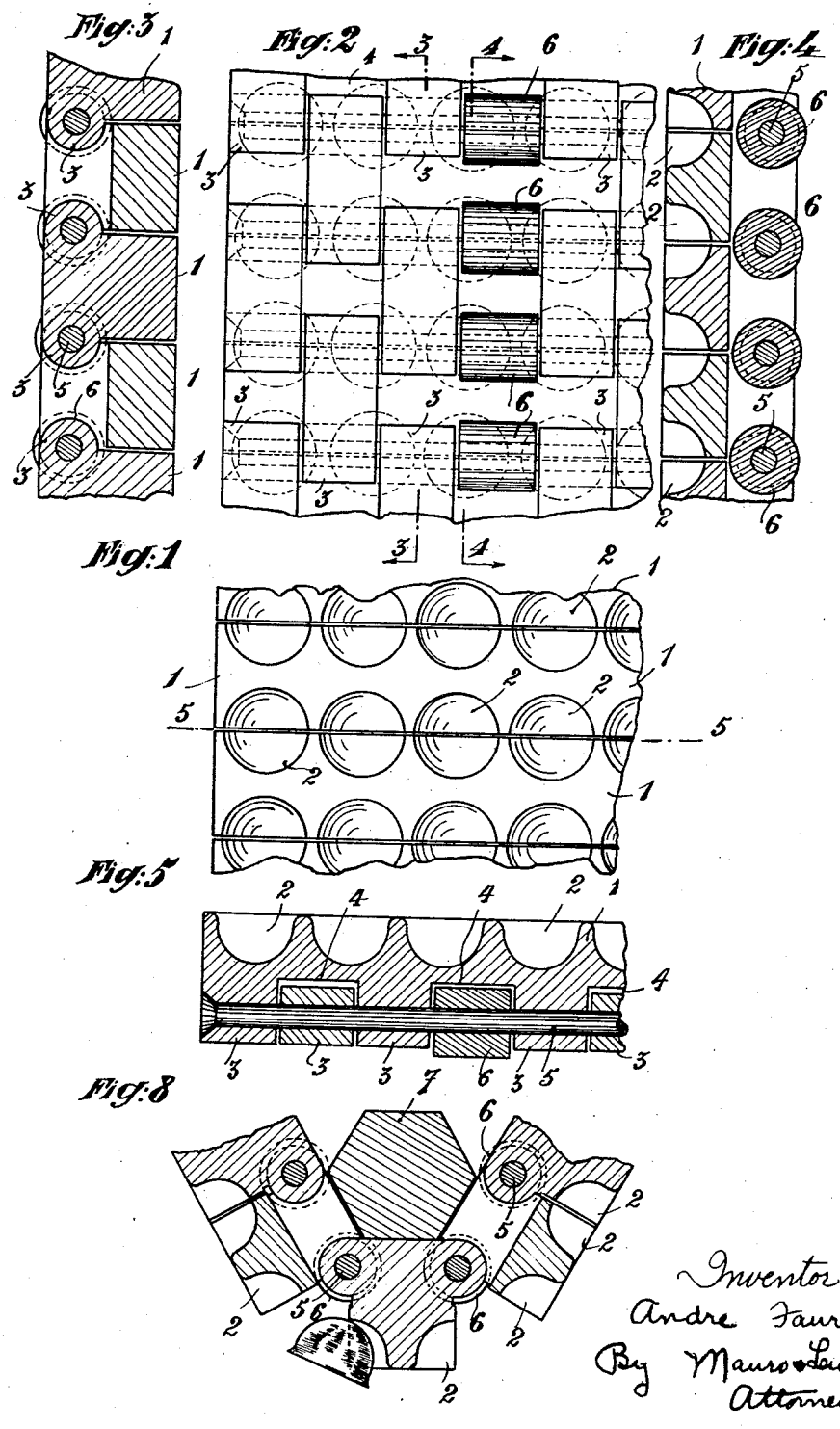

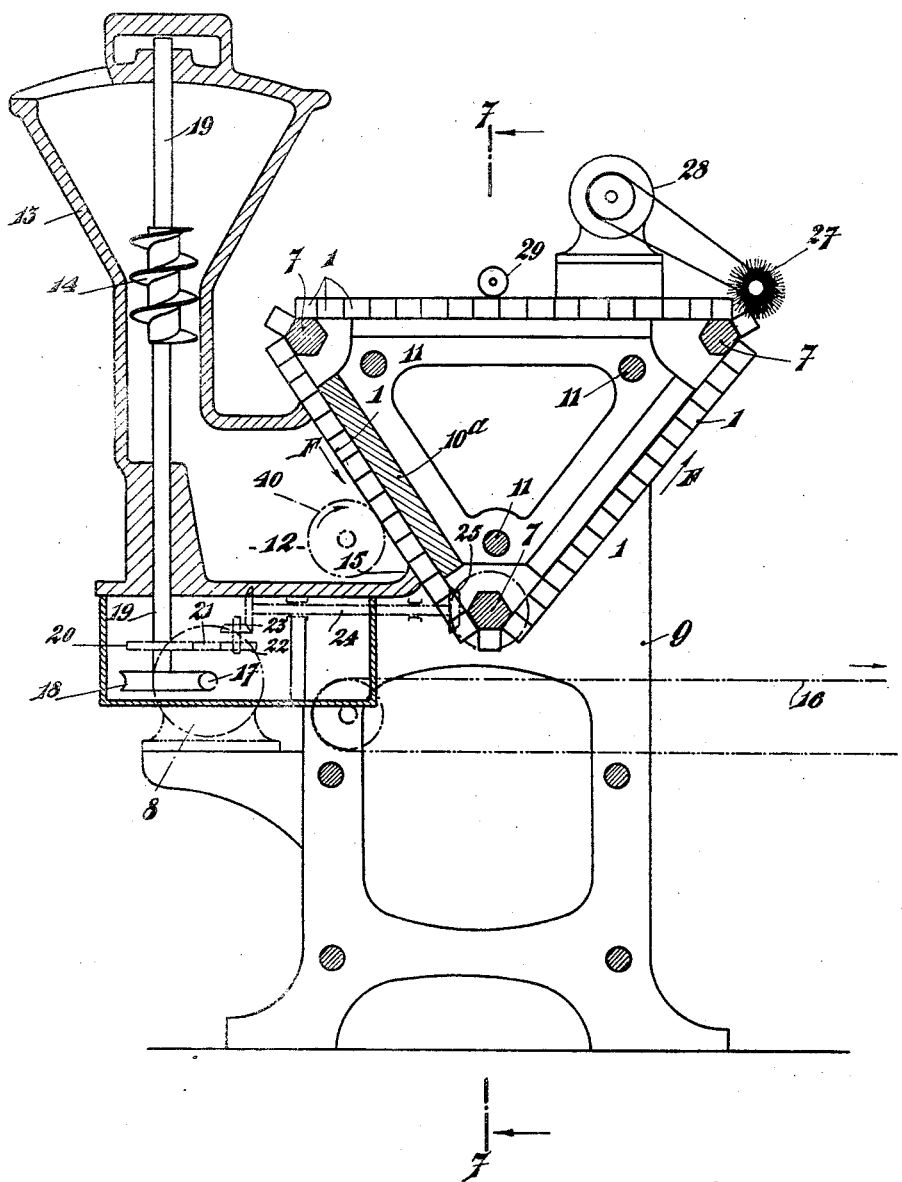

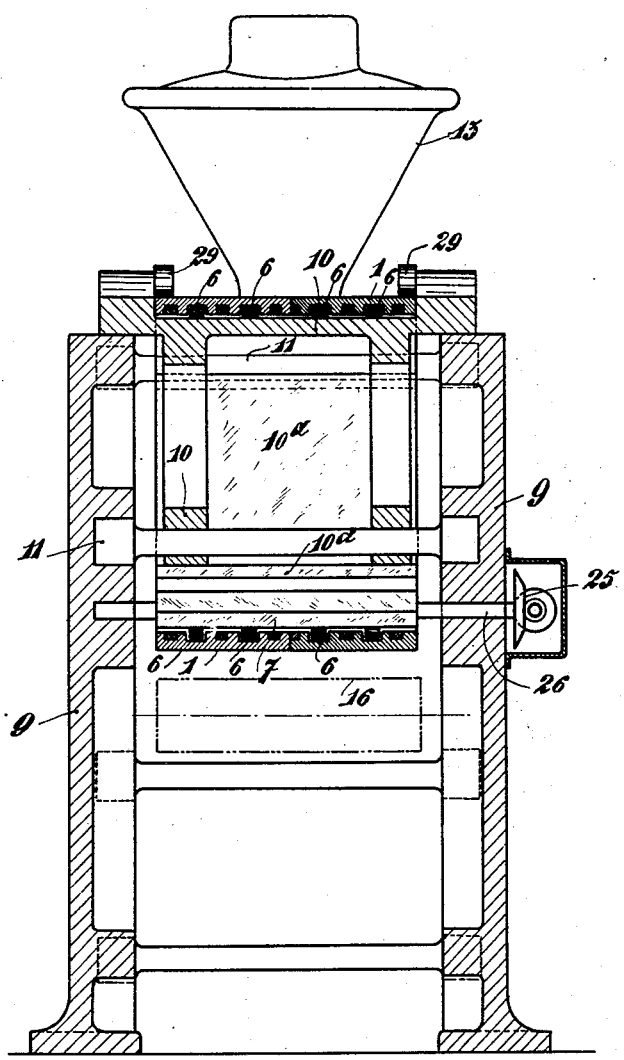

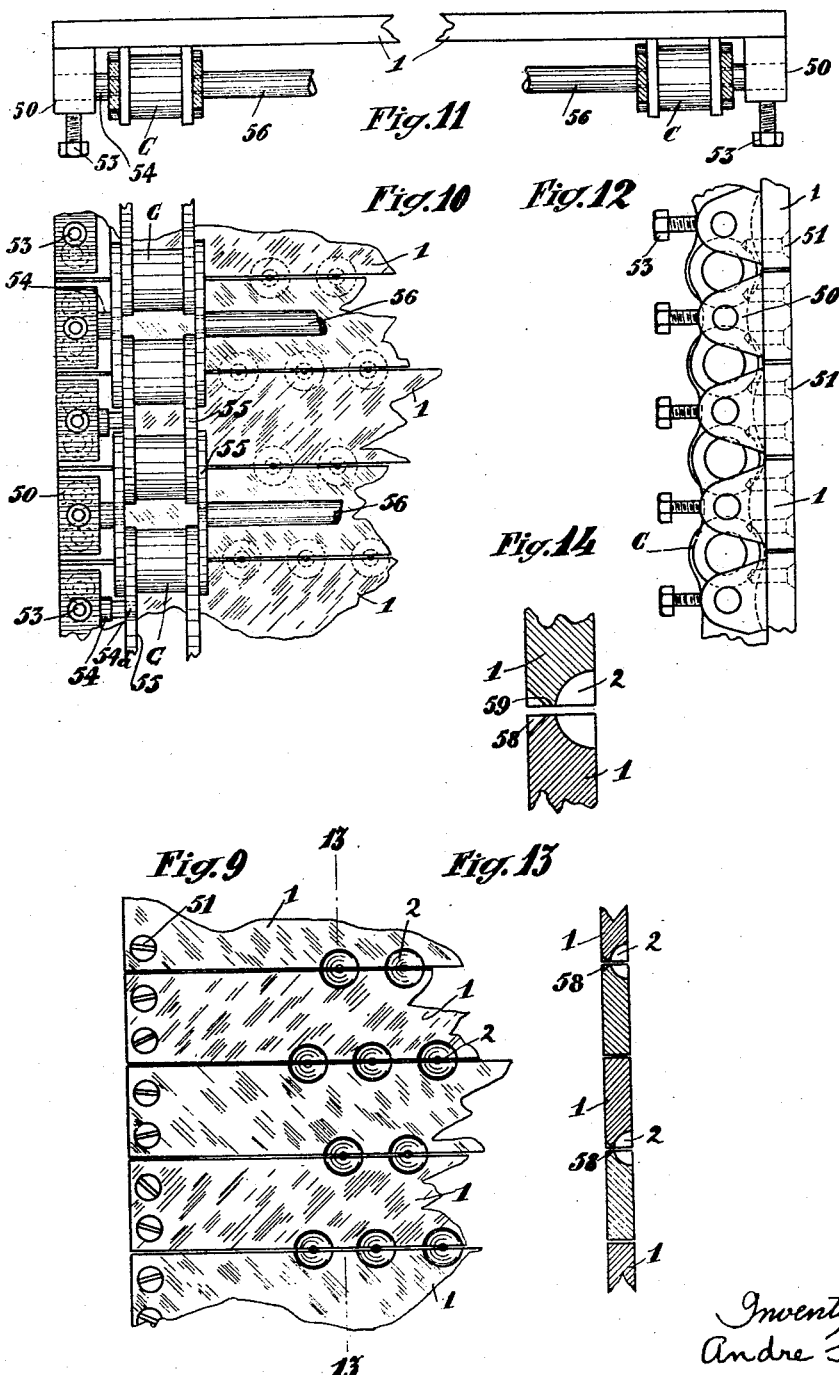

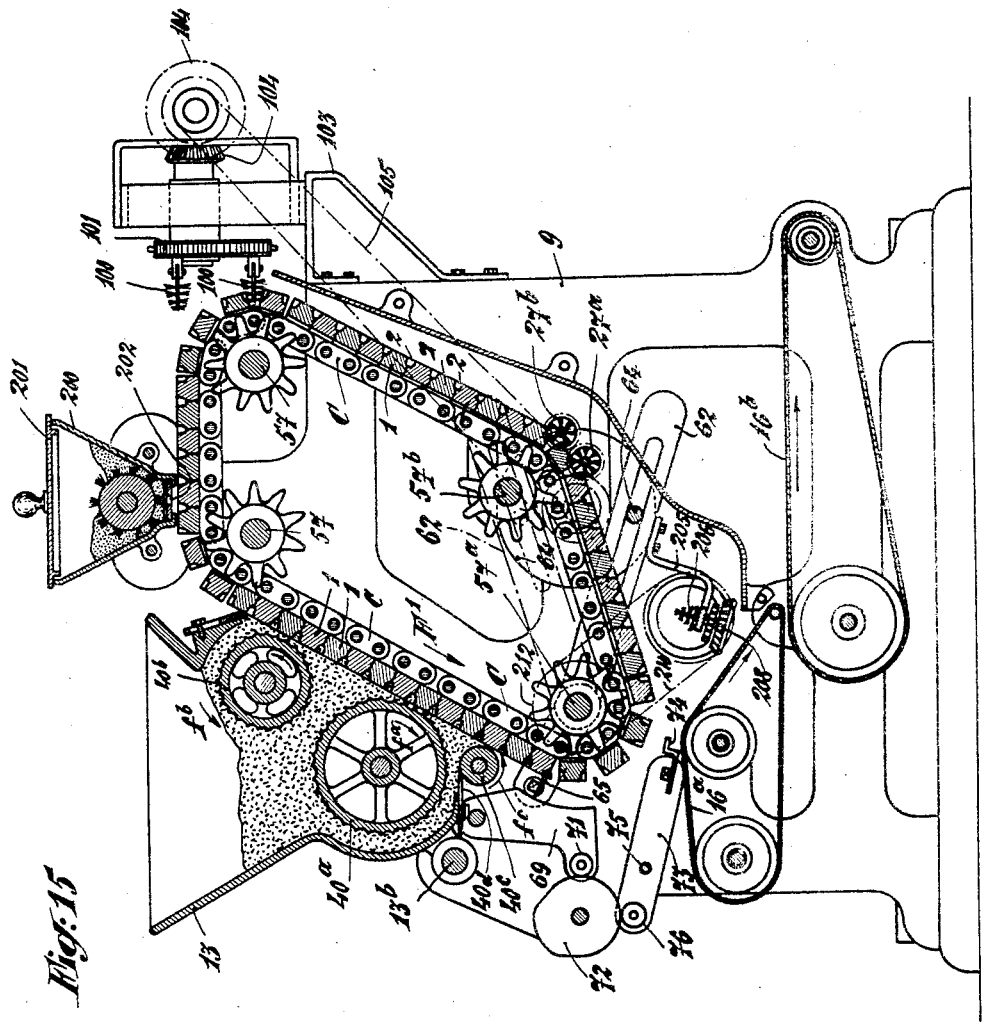

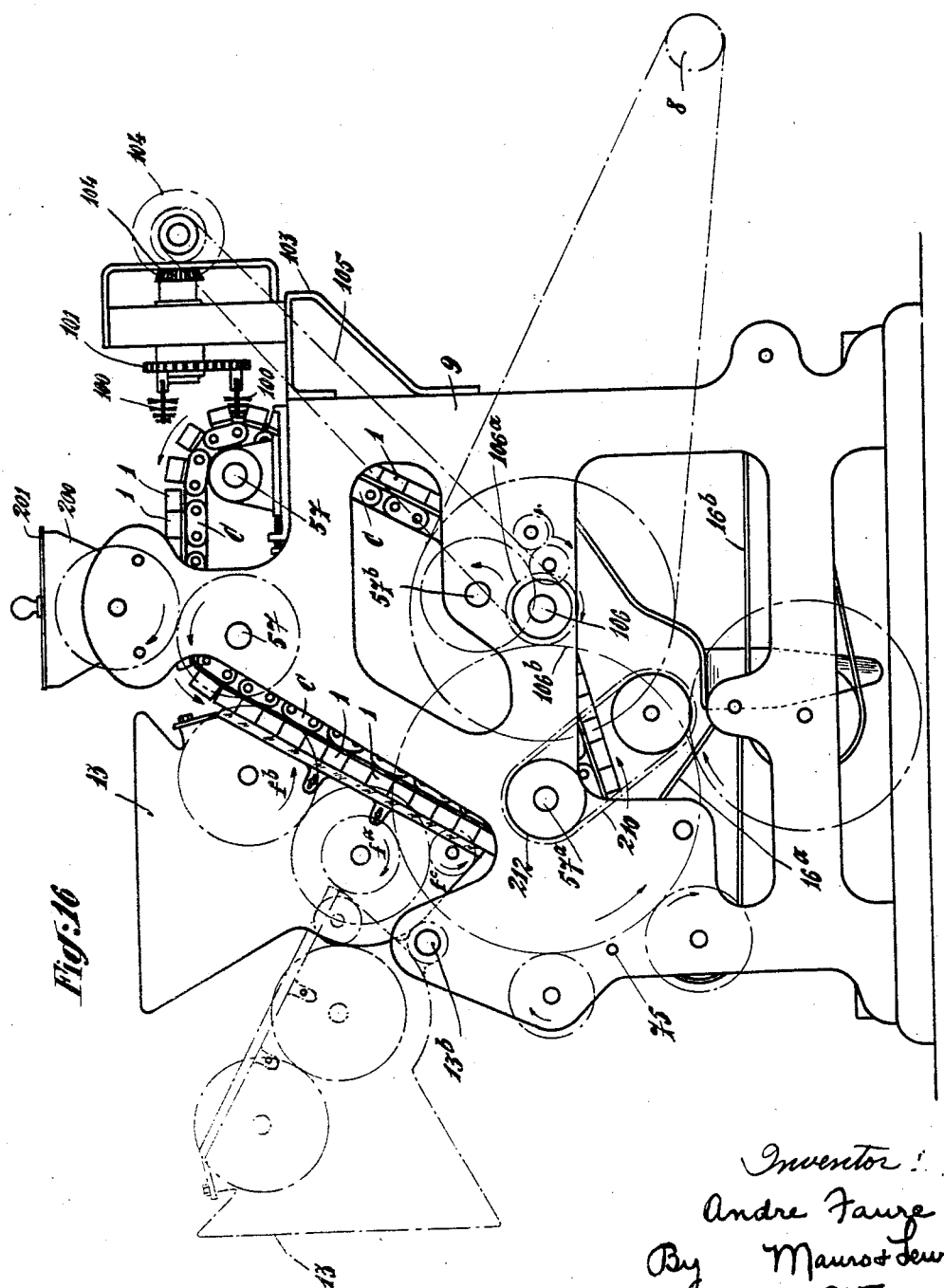

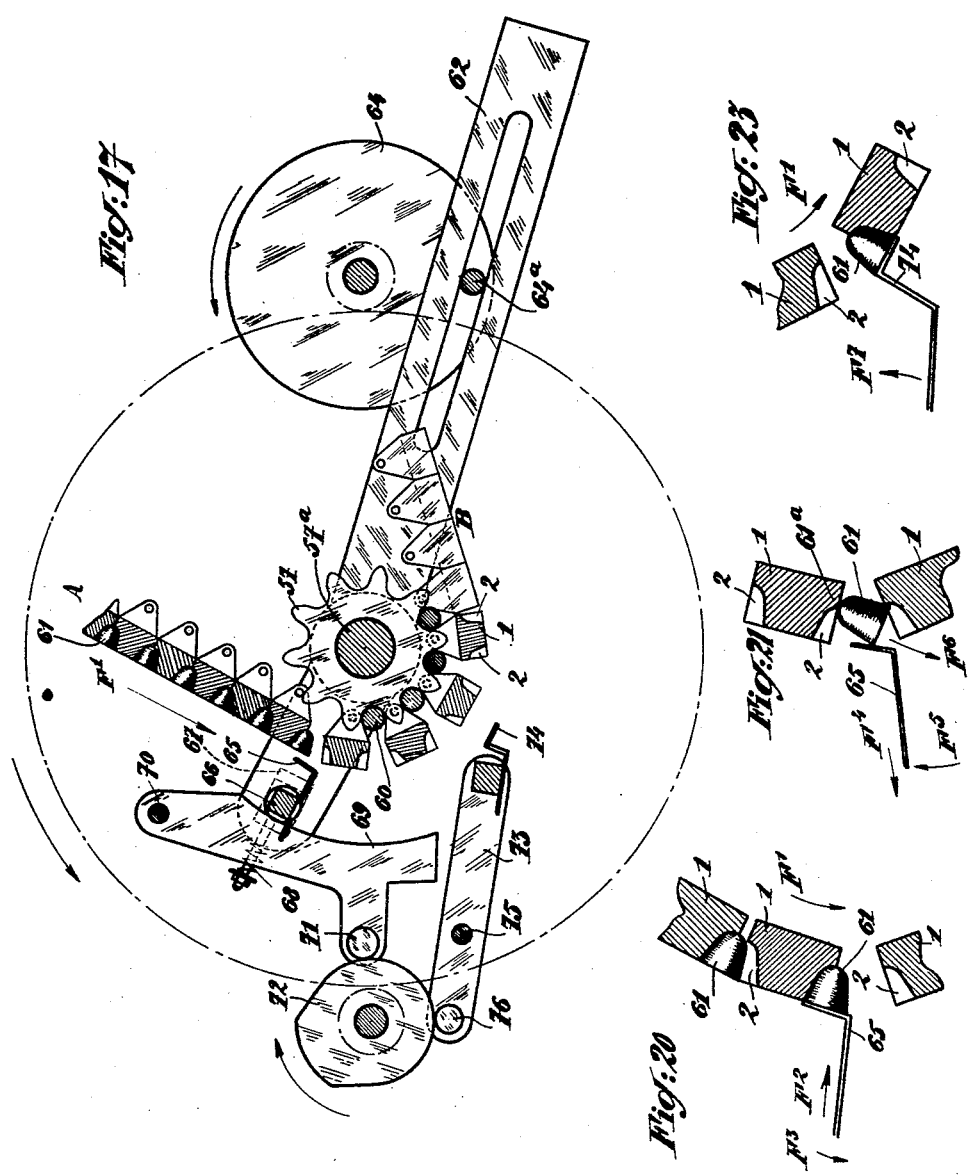

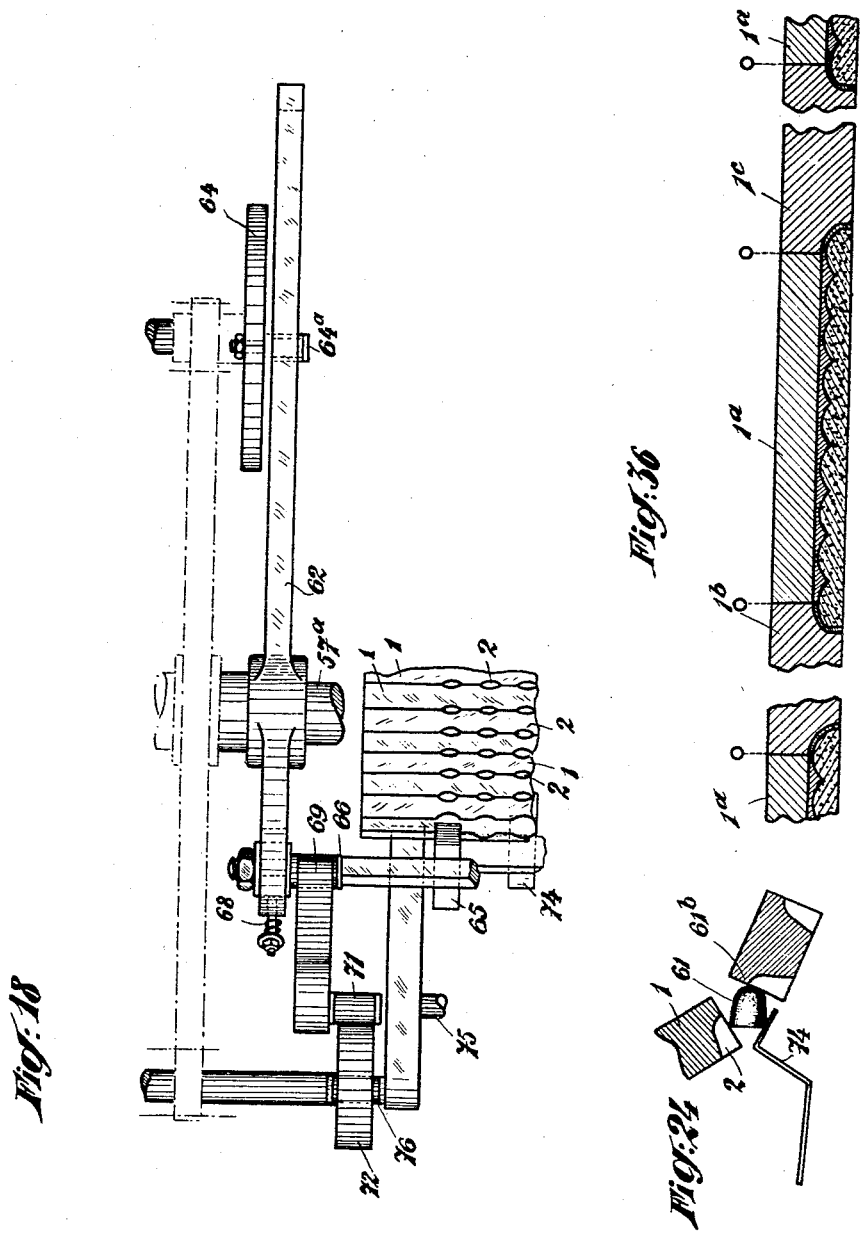

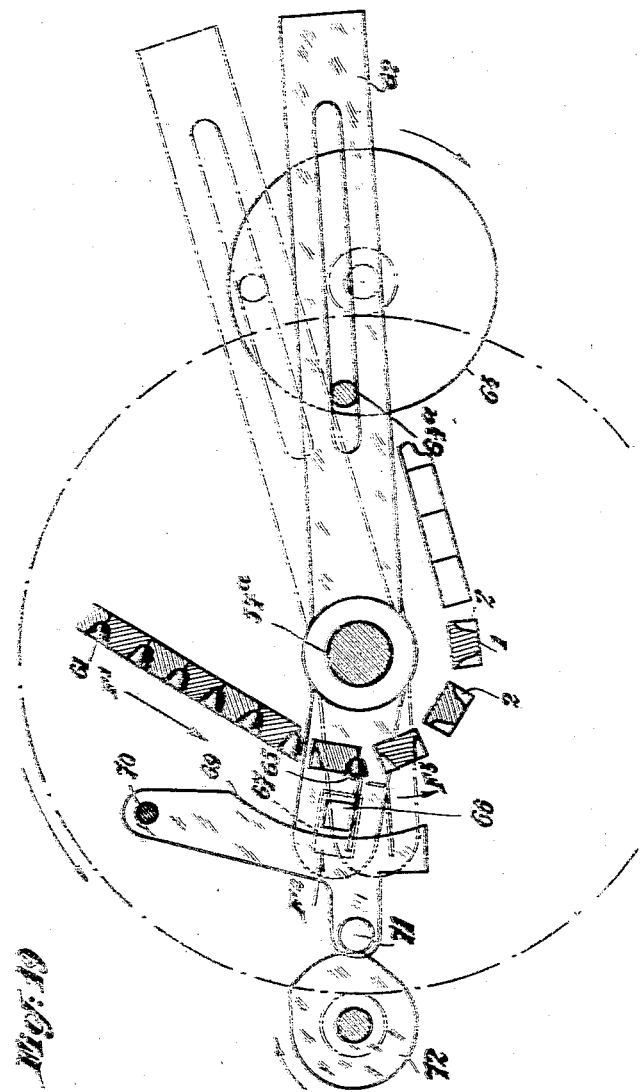

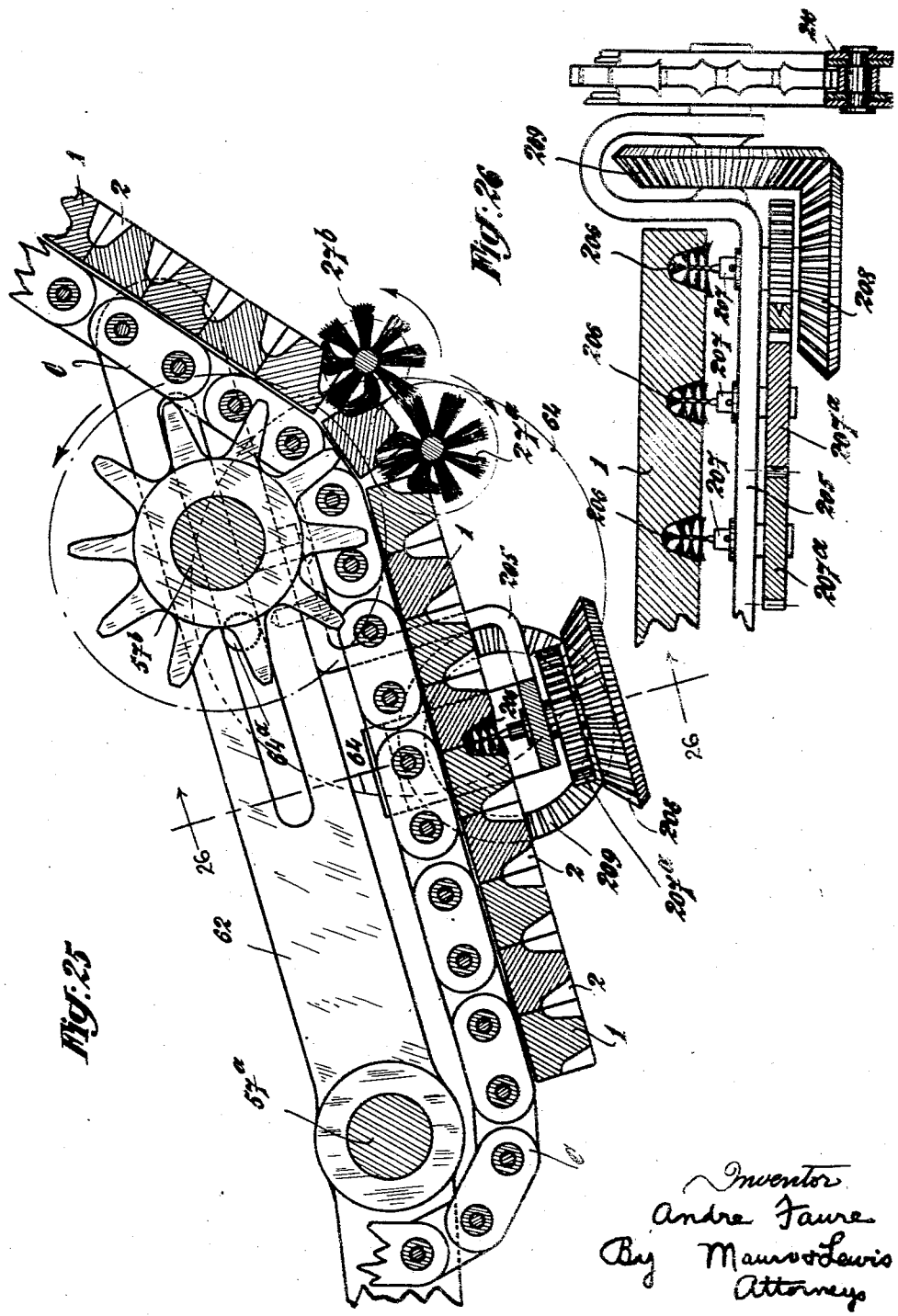

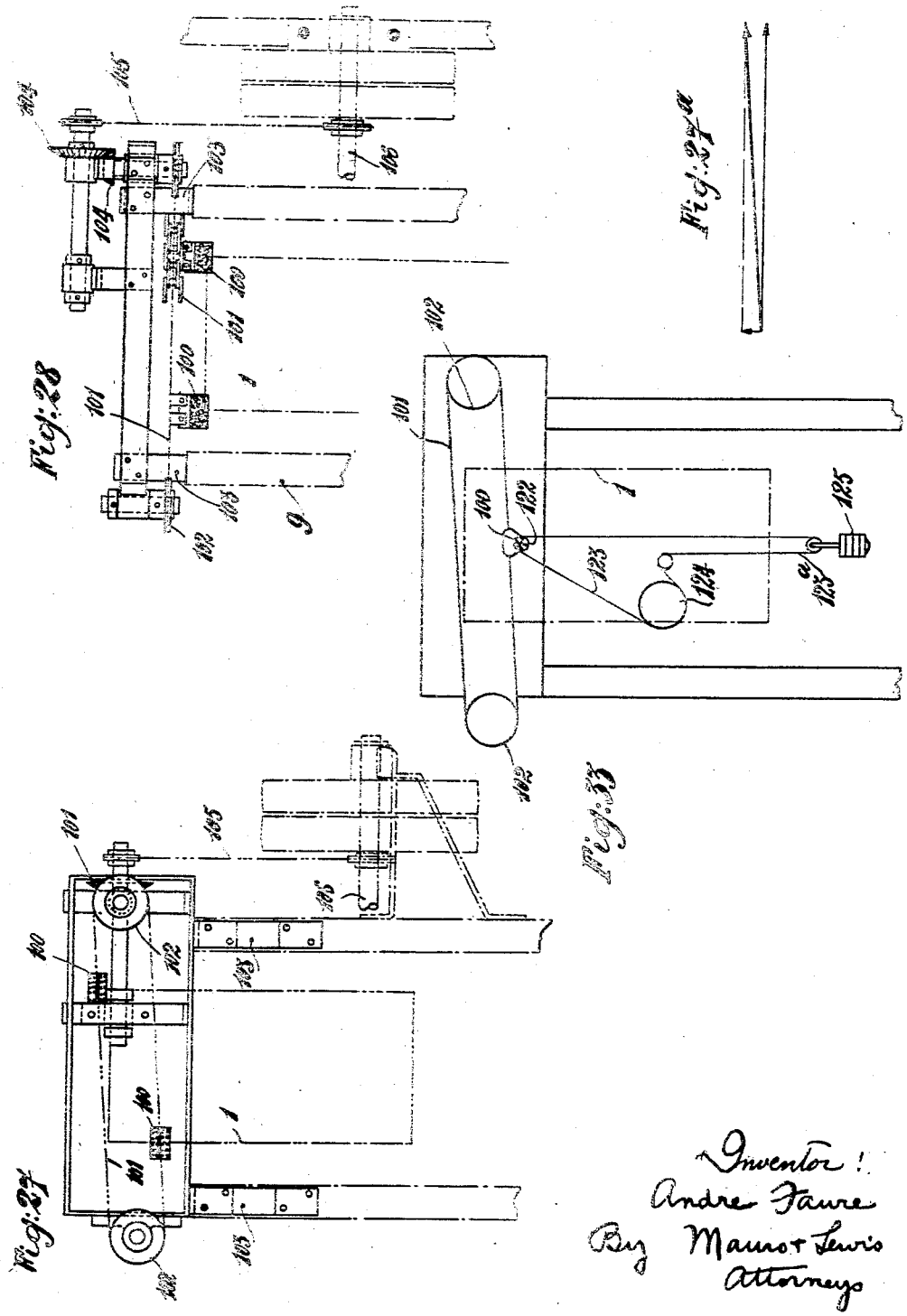

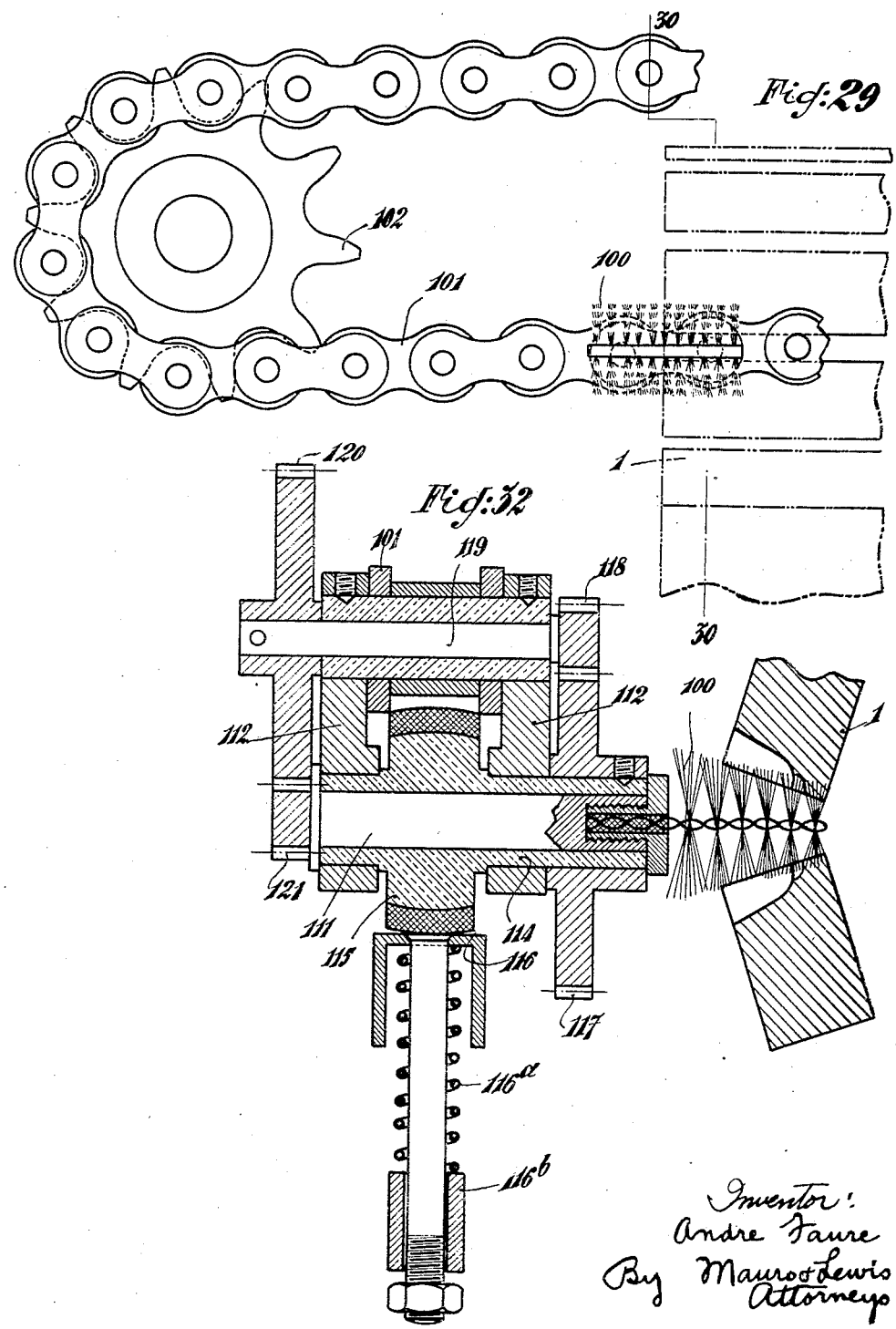

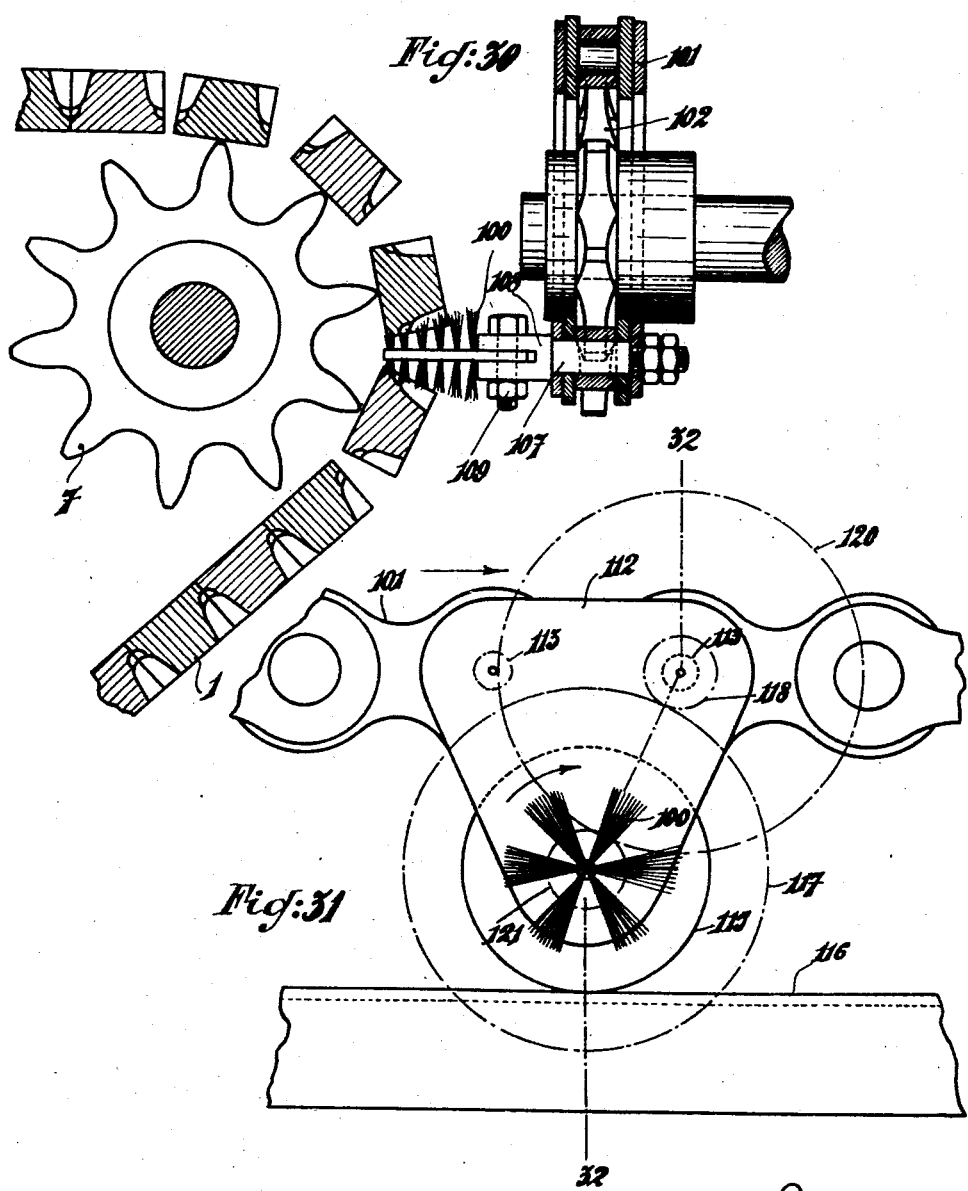

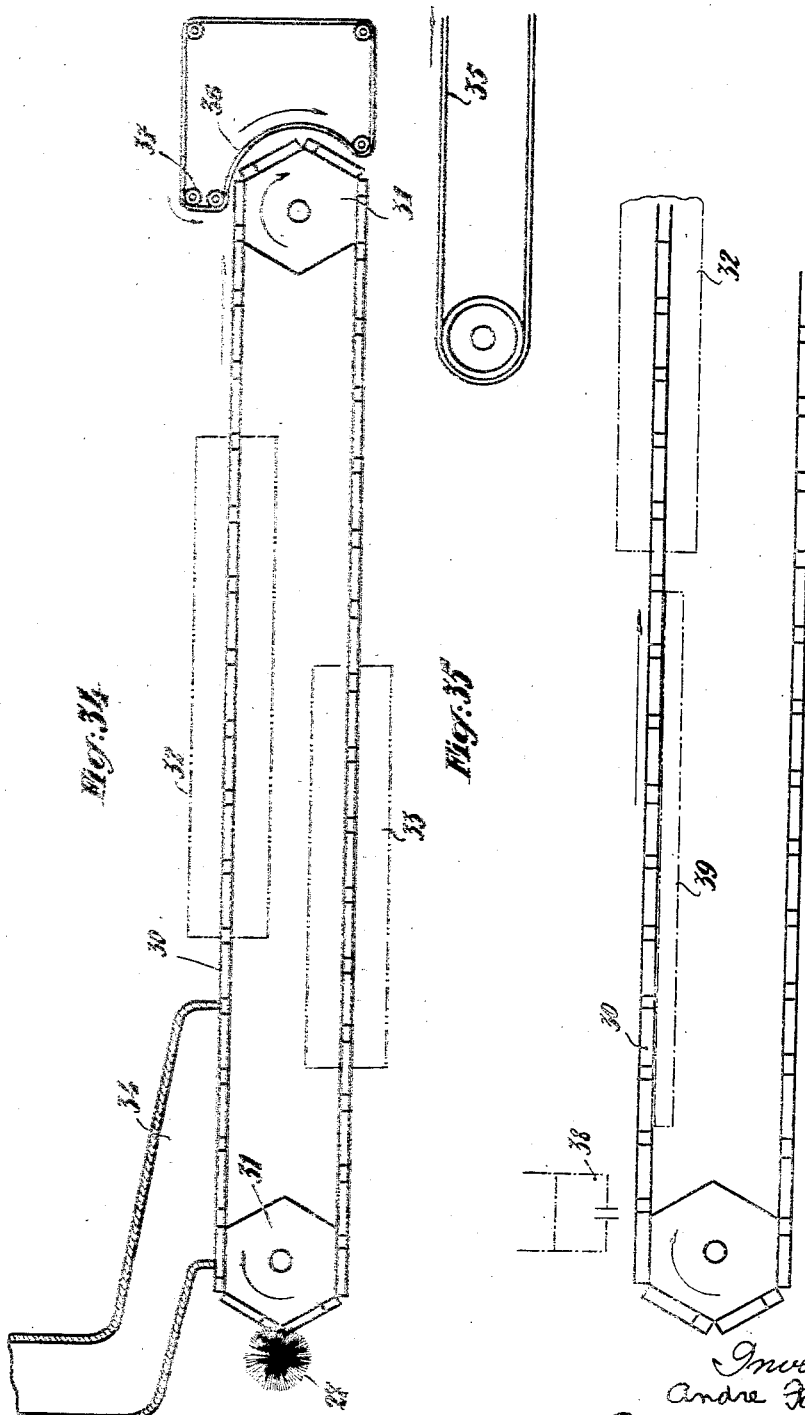

Patented Jan. 12, 1932

1,840,438

UNITED STATES PATENT OFFICE

ANDRÉ FAURE, OF IVRY, FRANCE, ASSIGNOR TO ETABLISSEMENTS JULIEN DAMOY, SOCIETE ANONYME, OF PARIS, FRANCE, A COMPANY OF FRANCE

AUTOMATIC CONTINUOUS MOLDING MACHINE

Application filed February 9, 1931, Serial No. 514,660, and in France February 12, 1930.

My invention has for its object an automatic continuous molding machine adapted to the manufacture of biscuits, Italian paste, praline core for chocolate confections, chocolate or sugar sweets, bars and in general all objects capable of being molded for alimentary or other uses.

Said machine automatically performs the molding and unmolding operations and therefore makes it possible to very nearly eliminate hand labour in that type of manufacture.

The principle of my invention consists in that the matter to be molded, which is introduced under pressure into the molding cavities, is ejected after molding through opening of the mold, and that as well when tapered as when undercut.

The machine according to the present invention comprises, as an essential organ, an alveolate or honeycomb endless chain consisting of a plurality of elements jointed to each other and provided with pits or cavities adapted to act as molds of suitable shapes. Said cavities are so formed as to extend in two adjacent elements, consisting of two half cavities provided in the adjacent edges of two such elements, so that when the elements of the chain are in line, the cavity is well limited by the two half cavities that are brought opposite each other, while when the adjacent elements are rotated with respect to each other through a certain angle, the corresponding half cavities are moved apart from each other, which allows of the molded product falling from the mold or being extracted therefrom.

Said endless chain is mounted over driving rolls or wheels and the cavities are filled in a certain point of its path with matter in the pasty or semifluid state fed under pressure, through any suitable device, for instance a hopper provided or not with feeding rolls. After being molded, the product is removed from the cavity, through the action of gravity or by means of a suitable mechanical device, when the half cavities are separated from each other, which takes place when the chain is passing over one of the guiding rolls or pulleys. Said extraction from the mold can be helped, if need be, by means of any suitable device, such as blowing or vibrating appliances or the like.

It is advantageous that the axes of articulation of the different elements that go to form the molding chain should be located at a distance as great as possible from the bottoms of the mold cavities so as to permit undercut molding, that is to say molding of pieces having one or several restricted portions. Furthermore, in an embodiment which is especially interesting for practical purposes, a play or clearance is provided between the rear face of the elements, that is to say the face opposite to the cavities, and the axes of articulation. And preferably, the parts of said axes that serve to connect together the elements of the molding chain are not located opposite the portions of said chain that are provided with molding cavities but are provided on the sides of said portions. For instance the elements are provided on their sides with lugs in which the axes of articulation are inserted.

This very important arrangement prevents matter to be molded from entering the articulations, which would produce after a very short time clogging or even breaking of the axes of articulation, and would involve in any case exaggerated friction. Besides, owing to this arrangement, the internal edges of the contiguous faces of the elements do not remain close to each other, but on the contrary are moved entirely apart from each other as the elements rotate relatively to each other when the chain passes over a guiding roll or wheel. This makes it possible to clean the chain mechanically after extraction of the molded products by means of suitable brushes moved between the chain elements.

An advantageous embodiment of the molding chain consists in assembling the elements provided with cavities by means of sprocket chains or mechanical transmission chains whose links are secured to the lateral flanges of said elements. The sprocket chain or similar transmission chain will thus form the longitudinal main element of the molding chain and will also serve to its driving through suitably disposed sprockets.

For some matters the action of gravity will be sufficient for producing the removal of the molded products from the mold when the chain is passing over the lower guiding wheels or pulleys, owing to the movement of the elements apart from each other. But for other matters that are particularly sticky, the action of gravity may be insufficient. In that case, in order to remove the products from the molds, use will be made of auxiliary devices such as combs, aspirating devices or the like, disposed in front of the honeycombed endless chain at the place where the molded products must be removed from the mold, and actuated through a suitable mechanism driven from the machine with such a motion that said auxiliary devices will take hold of the products that remain stuck to one or the other of the half cavities that form the mold and will dislodge them therefrom. As as rule, two comb devices will be provided, one serving to remove the products that adhere to the upper half cavities and the other serving to remove the products that adhere to the lower half cavities. These two comb devices will, for instance, be given vertical reciprocating motions combined with a movement for driving them toward and away from the cavities of the chain in order to remove the molding products therefrom.

The cleaning of the molding chain after removal of the molded products in order to remove all the particles that might still adhere to the chain may be effected in various manners. Suitably moving brushes will generally be used. Some of them, particularly intended to clean the cavities will have their axes at right angles to the plane of the chain and will be driven toward and away from said chain, while being given a continuous rotary motion. Other rotary brushes, mounted about axes parallel to the plane of the chain but transversally disposed with respect to said chain, will serve to a further cleaning of the half cavities. Finally, brushes having a continuous motion in the transverse direction of the molding chain and successively entering the intervals between the elements of the chain at a place where said elements are spaced apart, will serve to clean the contiguous faces of two adjacent elements. In an embodiment of my machine, said brushes will be secured to a sprocket chain, a belt, a cable, or any transmission means moving with a translatory motion transversally to the molding chain. It will be readily understod that, due to the movement of the molding chain, it is necessary that this transmission means should be so disposed as to make a certain angle with the transverse direction of said chain, said angle corresponding to the resultant of the speed of said transmission means and of the speed of the molding chain. It is possible to give the brushes a continuous rotary motion while they are being moved transversally with respect to the chain by pivotally mounting them on their support and providing them with a roller adapted to run on a suitable guide.

In order to manufacture articles of a certain size such for instance as chocolate bars or sugar or chocolate little figures, it is also possible to use a honeycomb chain consisting of elements articulated to each other and in which the cavities extend along several successive elements, for instance along three elements or even more, and it will be possible in that case to provide on the walls of the cavities a protective coating unalterable by the matter to be molded. In the case of a matter that is fluid in the hot state and solid at ordinary temperature, it will also be possible to combine the honeycombed molding chain with heating or refrigerating chambers so as to realize the desired change of state. The molding chain will first pass through a heating oven which will bring the elements to a suitable temperature, then in front of the aperture of a feeding conduit or hopper adapted to supply matter under pressure, then through a refrigerating chamber adapted to produce solidification of the matter contained in the cavities, and finally to an apparatus for removing the solidified molded objects from the cavities.

Several prefered embodiments of my machine will be hereinafter described with reference to the appended drawings, given merely by way of example, and in which:

Fig. 1 is a top view of a first embodiment of the jointed chain;

Fig. 2 is a corresponding bottom view;

Figs. 3 and 4 are sectional views on the lines 3—3 and 4—4 of Fig. 2 respectively;

Fig. 5 is a sectional view on the line 5—5 of Fig. 1;

Fig. 6 is a view of an embodiment of a molding machine provided with a jointed chain such as the one shown in Figs. 1 to 5;

Fig. 7 is a sectional view on the line 7—7 of Fig. 6, seen from the direction indicated by the arrows;

Fig. 8 is a view at an enlarged scale illustrating the removal of the objects from the molds;

Fig. 9 is a plan view of a portion of the molding chain;

Fig. 10 is a corresponding bottom view;

Fig. 11 is a corresponding end view;

Fig. 12 is a corresponding side view;

Fig. 13 is a sectional view on the line 13—13 of Fig. 9;

Fig. 14 shows at an enlarged scale a detail of Fig. 13;

Fig. 15 is a general view, in perpendicular section, of a molding machine provided with a honeycombed chain such as the one shown in Figs. 9 to 14;

Fig. 16 is a general view of the same machine shown in vertical elevation;

Fig. 17 shows the whole of the device for removing the finished articles from the molds;

Fig. 18 is a partial plan view;

Fig. 19 shows at an enlarged scale the comb device that serves to remove from the molds the finished products that remain stuck to the upper half cavities;

Figs. 20 and 21 illustrate the operation of said comb device;

Fig. 22 shows the comb serving to detach the products that remain stuck to the lower half cavities;

Figs. 23 and 24 are detail views illustrating the operation of this comb;

Fig. 25 is a detail view illustrating the cleaning of the cavities of the chain by means of rotary brushes at right angles to said chain and by means of rotary brushes parallel to the plane of said chain;

Fig. 26 is a sectional view on the line 26—26 of Fig. 25;

Fig. 27 is an end view of the machine, and shows the cleaning brushes that move transversally to the molding chain;

Fig. 27a shows a detail;

Fig. 28 is a plan view corresponding to Fig. 27;

Figs. 29 to 32 are detail views of the brush carrying chain and of the mechanism serving to impart a rotary motion to the brushes;

Fig. 33 shows a different embodiment;

Figs. 34 and 35 show two different embodiments of a molding machine combined with chambers for heating and refrigerating the chain;

Fig. 36 and 37 show a chain adapted to serve to the molding of articles of a certain size, such, for example as chocolate bars.

The jointed chain used in the molding machine according to my invention is formed of a certain number of prismatic elements 1, each one of which is provided with half cavities 2, forming, by their juxtaposition to the half cavities of an adjoining element, molding holes or cavities whose form is that of the product to be obtained.

In order to connect these elements together, their under side is cut out so as to alternately form male parts 3 and female parts 4, and the connection is obtained through axes 5. The male and female parts are of course cylindrical so as to allow the angular relative movements of the jointed elements. Preferably recesses will be provided at suitable intervals so as to engage rollers 6 loosely mounted on axes 5.

In the molding machine shown in Figs. 6 and 7, the chain thus formed by the jointed elements 1 is mounted as an endless chain over three rolls 7, which form the edges of a triangular prism. At least one of these rollers, to wit the lower roller, which is driven through engine 8, has a polygonal section, and in the example shown, a hexagonal section. The rolls are mounted in the side plates of frame 9, which also forms the support for the whole of the machine. Inside the triangle formed by the chain is a frame 10, also triangular in shape and on whose sides roll the rollers 6 of the chain. This frame 10 is secured to the support through transversal bars 11. The sides of this frame 10 may either be continuous or consist of two or several portions having a plane surface, forming a runway for the rollers 6 of the chain. However, one of the sides 10a is continuous and serves to support the pressure exerted on the chain by the matter to be molded contained in feed passage 12 which is disposed in the prolongment of hopper 13.

The chain moves in the direction F, and its cavities are filled with the pasty or liquid matter to be molded as it passes in front of the feeding passage 12. A screw 14, mounted in hopper 14 keeps up a certain pressure in the midst of the pasty matter. The lower edge 15 of the feeding passage is slightly bent up in order to form a scraper against the cavities and to strike off the surplus matter. As the chain passes over the lower roll 7 (Fig. 8), the adjacent elements of the chain pivot with respect to each other, the cavities are drawn apart, and the molded products fall on the band conveyor 16 which takes them to another phase of treatment. Roll 7 may be driven for instance through an endless screw 17 and helical wheel 18, shaft 19, gear wheels 20, 21, 22, bevel wheels 23, shaft 24, and bevel wheels 25 one of which is keyed on shaft 26 of roll 7. Shaft 19, which passes through hopper 13 also carries feed wheel 14. But it will be readily understood that any other mechanical transmission means could as well be used.

The machine must further comprise any accessory organs as may be useful, such as a rotary brush 27, driven from engine 28, and serving to clean the cavities, thrust rollers 29 disposed at the upper part of the frame, and also automatic vibrating devices acting on the chain in order to facilitate the removal of the molded products from the mold. One of the rollers 7, for instance the roll on the right hand side of Fig. 6 could be mounted in adjustable bearings, so as to permit to modify the tension of the chain. Lastly, inside hopper 13, may be provided devices for reheating the matter.

Obviously, changes might be made in the embodiment that has just been described by way of example, without departing from the principle of my invention. For instance the cavities of the chain might be given any shape suited to the molding that it is desired to obtain.

Likewise, feeding screw 14 could be replaced by a fluted cylinder such as 40, shown in dotted lines in Fig. 6, which would permit the direct drive of cylinder 40 and driving roll 7 by means of chains.

The molding machine that has just been described makes it possible, among other uses, to manufacture chocolate sweets or pralines much more simply than it was possible heretofore.

The molding chain shown in Figs. 9 to 14, which is of a very advantageous type, consists of a plurality of elements 1, constituted by mere bars of rectangular section, and each of which comprises half cavities forming, by juxtaposition to the half cavities of an adjacent element, molding cavities having a shape corresponding to that of the product to be obtained. One element may comprise cavities of different shapes.

These elements are connected together by means of sprocket chains C or any other similar mechanical means (two such chains may for instance be provided) forming the longitudinal frame of the molding chain. Said sprocket chains may for instance be secured under elements 1 by means of the device that will be hereinafter described.

Each one of the elements 1 comprises a flange or lug 50 which may be integral with said element, welded thereto, or secured thereto by means of screws 51. Said lugs 50 each carry a spindle 54, secured thereto by means of a screw 53, and whose threaded head 54a is secured to one of the links 55 of chain C. Each one of the links of said chain is thus connected, through an intermediate spindle, to one of the elements of the molding chain. In order to strengthen the whole, the different sprocket chains C cooperating with the molding chain may be connected together through rods 56 forming cross pieces and which are interposed for instance, although this is not necessary, between every two links of the corresponding chains respectively.

In this embodiment, the molding chain can be more easily kept clean than in the above described embodiment, since the elements of the chain that serve to the molding proper and the pieces that serve to the mechanical drive are entirely separated.

This result might be further improved by the arrangement on the rear face of the molding chain and under each cavity, as shown in Figs. 13 and 14, of cavities 58, separated from cavities 2 by thin edges 59. It is thus possible to prevent the matter from accumulating in the intervals between the intervals of the chain, for the matter that tends to pass through the edges 59 is cut off, after removal of the molded article, when the elements of the chain, which had been moved apart, are again brought together, and the matter in cavity 58 falls under the action of gravity, when the chain, in the course of its motion, is placed in the opposite position.

Said chain may be made of any suitable material such as stainless steel, aluminium or light alloys, or the like.

It should be pointed out that the cavities, instead of being formed in the elements of the chain, might be formed in mold members secured to the chain elements.

Fig. 15 shows a molding machine provided with a chain of the kind shown in Figs. 9 to 14. The latter rests, through chains C of the sprocket or any other type, on sprocket wheels 57, in suitable number, the wheels keyed on shaft 57a being driven from engine 8.

The matter to be molded is introduced into hopper 13 and it is brought against the chain, which moves in the direction $F^1$, through fluted cylinders 40a and 40b which rotate in directions $fa$ and $fb$ respectively. The chain is then supplied with the matter to be molded; it then passes in contact with a smooth cylinder 40c, rotating in the direction of arrow $f^c$, against the upper surface of the chain. Said smooth cylinder serves to prevent matter to be molded to stick to the outer surface of the elements between the cavities. If that should occur, the matter stuck against the elements is removed by cylinder 40c, sticks to the surface of the latter and is removed therefrom by a scraper 40d, to be brought back into the hopper by cylinder 40a.

This combination of two fluted cylinders and of a smooth cylinder cooperating with a scraper is particularly advantageous in the case of the molding of a matter which has, in the wet or fluid state, a certain adhesiveness. It is the case, for example with chocolate or praline pastes that are used in confectionery.

The axles of the fluted cylinders and of the smooth cylinder are mounted in the lateral walls of hopper 13, and the latter is mounted in such manner as to be able to rotate with respect to stationary frame 9 of the machine, about axes 13b, so as to permit, eventually, the cleaning of the cylinders.

In order to better ensure that the matter to be molded will not stick to the chain, which would make the removal of the molded products less easy, said chain may be sprinkled with a powdered material adapted to prevent this sticking. When the matter to be molded consists of chocolate or another alimentary product, the chain may be sprinkled with powdered sugar. To this effect, use is made of a box 200 provided with a cover 201, disposed in a suitable place above the chain, and which is filled with the powdered material. Said box is provided at its lower part with apertures 202 and it contains a brush or rotary scraper 203 which is driven at a speed such that one of its peripheral brushes or teeth may pass above orifice 202 every time a row of cavities of the chain is located below said orifice.

The molded products are removed from the chain when the latter passes over the lower sprocket wheels 57 which are mounted about axle 57a. Said operation may be effected by the sole action of gravity, as a result of the relative movement of the elements carrying the cavities away from each other, said action being completed by that of auxiliary devices such as combs or aspirating devices, whose working will be hereinafter explained.

The products removed from the chain fall on a first conveyor 16a, and thence on a second conveyor 16b, which carries to another step of the manufacture.

It is particularly important to clean the cavities of the chain after removal of the molded articles, in order to remove the particles of matter that might still adhere thereto. In the machine shown in the drawings, said cleaning is effected by means of several rotary brushes. Brushes 206 are mounted through their axes 207, on a support 205 secured to a rocking arm 62, which oscillates in a continuous manner, from the position shown in solid lines to that shown in dotted lines, about axis 57a. The driving mechanism of this rocking arm will be hereinafter described.

Brushes 206, the number of which is equal to that of the cavities of the chain, are disposed in such manner that when rocking arm 62 is in the position shown in dotted lines, as shown in Fig. 15 and at an enlarged scale in Fig. 25, each of these brushes enters into the cavity located in front of it, the axis of said brush being then at right angles to the plane of the chain. The axes of these brushes are connected together through gear wheels 207a. They are given a continuous rotary motion through a couple of bevel pinions 208—209 and a transmission chain 210 itself driven by sprocket wheel 212 which is keyed on axis 57a. The latter, which serves to drive the molding chain, receives its motion from main shaft 106 through gear wheels 106a—106b.

In order to complete the cleaning of the cavities, are provided two rotary brushes 27a and 27b, rotating in opposite directions and the axes of which are parallel to the plane of the chain.

Lastly, it is also very important to clean the intervals between the elements so as to remove the particles of matter that might have entered these intervals and which would prevent the correct application of the elements against each other. Said special cleaning will be hereinafter explained.

Figs. 17 to 24 show the device for unmolding the finished articles when the opening of the cavities is not sufficient for producing the removal of said articles by gravity. In that case the molded products remain stuck, either to the upper half cavities (Figs. 19 to 21) or to the lower half cavities (Figs. 22 to 24).

The device for removing said products comprises two combs 65 and 74 which serve respectively, the first to remove the products stuck to the upper half cavities and the second to remove the products stuck to the lower half cavities.

Combs 65 are fixed to an axis 66 carried by rocking arm 62, as already stated, which arm is given an oscillatory motion about axis 57a through the action of the crank pin 64a of a crank disk 64 rotating in the direction of the arrow of Fig. 17. Axis 66, which carries combs 65, may further be given a displacement in the longitudinal direction of lever 62 by sliding in a longitudinal slot 67 provided in said lever, against the action of spring 68. Said sliding motion is controlled by contact with an arcuate arm 69 pivotally mounted about an axis 70 and the motion of which is produced by a finger 71 adapted to slide along cam 72.

Combs 74 are carried by a lever 73 pivoted in 75 and driven through cam 72 and finger 76.

The operation of the device for actuating comb 65 is as follows: (Figs. 19 to 21).

When the upper half cavities of the elements 1 come, during the movement of the chain, opposite combs 65, the latter are displaced toward said half cavities by the action of arcuate arm 69 in the direction of arrow $F^2$, so as to be brought into contact with the products that have remained stuck to the upper half cavities (Fig. 20). Then lever 62 rotates about axis 57a, so as to come into the position shown in dotted lines in Fig. 19, which results in displacing combs 65 in the direction of arrow $F^3$, the driving arrangement being such that said motion is effected with a speed that is higher than that with which the chain moves in the direction of arrow $F^1$. It results therefrom that the molded product 61, which has been seized by comb 65, rotates about its top in 61a. When comb 65 comes back to its original position under the action of spring 68, by moving in the direction $F^4$, and simultaneously in the direction $F^5$ on account of the return movement of arm 62, product 61, left by the comb and detached from the cavity, will fall in the direction of arrow $F^6$.

If, now, the molded products remain stuck to the lower half cavities, as shown in Figs. 22, 23 and 24, they are brought into contact, during their displacement, with comb 74. Said comb 74 has been given, under the action of cam 72, a movement in the direction of arrow $F^7$ which is opposite to the direction $F^1$ of the molding chain. Accordingly, the molded products will swing about their tops 61b. They are thus detached from the lower half cavities, and as the chain further moves, they are left by combs 74 and fall on the conveyor.

Obviously modifications might be made to the embodiment that has been just described with respect to drawings 17 to 24, and which has been given merely by way of example. Combs 65 and 74 can be made of any suitable shape, either of a rigid material, metal for instance, or of elastic material such as india rubber or the like.

Instead of combs, use might be made of aspirating devices, connected for instance to a vacuum pump.

It has been above stated that it was important to clean, besides the cavities, the intervals between two adjacent elements, so as to remove all the particles of matter that might have entered these intervals. Said cleaning is effected by means of the device shown in Figs. 27 to 33. Said device comprises two brushes 100 secured to a sprocket chain 101 passing over pulleys 102 and moving in a continuous manner. Chain 101 runs transversally to molding chain 1, and pulleys 102 are located well outside said chain in order that brushes 100 may move from one end to the other of the intervals between elements of the molding chain. Furthermore, sprocket chain 101 makes, as shown in Fig. 27a, an angle with the molding chain that corresponds to the composition of its own speed with that of the molding chain.

Sprocket chain 101, which carries brushes 100, is driven from main shaft 106 of the machine through the intermediary of transmission chain 105 and of bevel wheels 104. The speed of its motion is suitably calculated with respect to that of the molding chain, and brushes 100 are suitably placed along said chain in order that said brushes may engage one after the other the intervals between the elements of the molding chain. The whole of the brushing device is secured through all suitable means to the frame 9 of the molding chain, for instance by means of a bracket 103 secured to said frame.

Figs. 29 and 30 show the means for fixing brushes 100 to sprocket chain 101 by means of spindles 107 provided with jaws 108 and screws and nuts 109.

If it is desired to increase the efficiency of the action of the brushes by giving them a continuous rotary motion during their displacement in the intervals between the elements of the molding chain, use may be made of the device shown in Figs. 31 and 32. Brush 100 is secured to an axis 111 pivoted in plates 112, which are articulated in 113 to two adjoining elements of sprocket chain 101. A sleeve 114 is adapted to rotate about axis 111 and said sleeve is provided with a friction roller 115 which is adapted to roll on a guide or rail 116. The rotary motion of roller 115 is transmitted to axis 111 and therefore to brush 100 through a multiplying gear which is formed as follows: Sleeve 114 carries a gear wheel 117 meshing with a pinion 118 secured to spindle 119 which is rotatably mounted in plates 112. Said spindle 119 carries a gear wheel 120 meshing with a pinion 121 provided on axis 111. In order to ensure a good contact between roller 115 and guide 116, said guide is forced against said roller through springs 116 bearing against a stop 116$^b$ secured to the frame.

In the embodiment shown in Fig. 33, the brushes are rotated through a pulley 122 mounted on axis 111. Over said pulley passes a cable or a belt 123 driven through a pulley 124 and forming a loop 123a adapted to compensate for the displacement of pulley 122 together with chain 101, owing to the action of a weight 125.

The number of brushes mounted on organ 101, and the very nature of said organ (belt, cable, sprocket chain, and so on) are susceptible of being modified. Instead of securing brush elements to an organ of transmission one might provide for that special purpose a continuous brush consisting of brush elements articulated to each other so as to form a chain.

The machine shown in Fig. 34 is more particularly adapted to the manufacture, by molding, of objects of a certain size, from a matter that is solid at the ordinary temperature. Chain 30, which is formed as above explained, but with cavities having a suitable size and shape, is driven through rolls 31. Said chain passes through a chamber 32 for refrigerating the matter, and through a heating oven 33. Matter is fed through a conduit 34 in front of which passes the chain during its travel from oven 33 to refrigerating chamber 32. Conduit 34 may be heated in order to ensure that the matter will be in a pasty state necessary for suitably filling the cavities of the chain, or it may not be heated if the heating of the chain through oven 33 is sufficient for ensuring the same result. Said two modes of heating might also be combined. The matter fills the cavities in the pasty state; it is then solidified in these cavities by the passing of the chain through refrigerating chamber 32, and removed from said chain by gravity after passing over roll 31 and then falls on conveyor 35. A band 36, rolling over rollers 37 may be disposed opposite roll 31 so as to prevent premature fall of the molded products. As in the precedently described embodiments, a brush 27 serves to clean the chain.

Fig. 35 shows another embodiment in which pasty matter is fed to chain 30 through a pouring device 38. The molding chain then passes through refrigerating chamber 32. In 39 are provided vibrating devices for distributing on the chain the molded products.

In the machines shown in Figs. 34 and 35, and generally speaking, whenever it will be necessary to mold objects of a notable size, as for instance chocolate bars, it will be necessary to use a molding chain of the type shown in Figs. 36 and 37 of the appended drawings.

Said chain is still formed of elements 1 articulated together, but the mold cavity, instead of extending along two contiguous elements of the chain, extends along three elements 1ª, 1ᵇ, 1ᶜ, element 1ª comprising nearly the whole of the mold cavity and elements 1ᵇ comprising but two small recesses 2ᵇ which form the ends of the bar. Said improvement makes it possible to avoid the fin resulting from the molding that would otherwise be produced in the central part of the bar if the mold cavity extended along only two adjacent elements of the molding chain. It also facilitates the machining of said chain. Furthermore it makes it possible to easily coat the walls of the cavities with an intermediate material 80 impervious to the action of the matter to be molded.

The machine that has been described has many advantages. It makes it possible to notably decrease the number of operations that up to now were necessary for manufacturing chocolate sweets.

The praline material serving to make fillings for sweets which is molded from the molding machine from the paste introduced into the hopper may be discharged directly from the machine in the state of molded products on the moving belt of the machine that serves to coat said products with a layer of suitable matter. The manufacture of praline sweets, which, up to this time, had to be effected in at least two distinct steps, may therefore be carried out, owing to my invention, in a single group of machines, without necessitating any manual operation between the introducing of the praline matter into the hopper and the collecting of the finished sweets.

What I claim is:

1. In a continuous molding machine of the type described, an endless chain structure comprising a plurality of elements adapted to fit against each other, inwardly extending lugs fixed on the ends of said elements at right angles thereto, so as to form two parallel series of lugs, one on either side of the chain structure, two parallel sprocket chains disposed inside said endless chain structure close to said two series of lugs respectively, with their outward side plates located opposite the inner faces of the corresponding lugs respectively, a stud in each of said outward side plate at right angles thereto, the corresponding lug being provided with a registering hole for said stud, means on said lug for firmly securing said stud in said hole, whereby relative rotation of two adjacent links of each sprocket chain located opposite each other will bring the two corresponding elements of the endless chain structure wide apart from each other, said elements being provided, in the outer part of their abutting faces, with notches located opposite each other, whereby the chain structure, when in line, is provided with cavities each extending on either side of the surface of junction of two adjoining elements, which cavities may be filled with the matter to be molded while, when the chain is in a curved line, the two notches that form each cavity are moved apart from each other, whereby the molded products are allowed to leave the chain.

2. In a continuous molding machine of the type described, an endless chain structure comprising a plurality of elements adapted to fit against each other, inwardly extending lugs at right angles thereto adapted to fit on the inner faces of said elements at both ends thereof, so that their outer lateral faces are flush with the lateral end faces of said elements, at least one screw extending through each end of said elements for removably fixing each lug to the corresponding element, so as to form two parallel series of lugs, one on either side of the chain structure, two parallel sprocket chains disposed inside said endless chain structure, close to said two series of lugs respectively, with their outward side plates located opposite the inner faces of the corresponding lugs respectively, a stud in each of said outward side plates at right angles thereto, the corresponding lug being provided with a registering hole for said stud, a screw in said lug, at right angles to said stud, for firmly securing it in said hole, whereby relative rotation of two adjacent links of each sprocket chain located opposite each other will bring the two corresponding elements of the endless chain structure wide apart from each other, said elements being provided, in the outer part of their abutting faces, with notches located opposite each other, whereby the chain structure, when in line, is provided with cavities each extending on either side of the surface of junction of two adjoining elements, which cavities may be filled with the matter to be molded, while, when the chain is in a curved line, the two notches that form each cavity are moved apart from each other, whereby the molded products may leave the chain.

3. In a continuous molding machine of the type described, an endless chain structure comprising a plurality of elements adapted to fit against each other, inwardly extending lugs at right angles thereto, adapted to fit on the inner faces of said elements at both ends thereof, so that their outer lateral faces are flush with the lateral end faces of said elements, at least one screw extending through each end of said elements for removably fixing each lug to the corresponding element, so as to form two parallel series of lugs, one on either side of the chain structure, two parallel sprocket chains disposed inside said endless chain structure, close to said two series of lugs respectively, with their outward side plates located opposite the inner faces of the corresponding lugs respectively, a stud in each of said outward side plates at right angles thereto, the corresponding lug being provided with a registering hole for said stud, a screw in said lug, at right angles to said stud, for firmly securing it in said hole, whereby relative rotation of two adjacent links of each sprocket chain located opposite each other will bring the two corresponding elements of the endless chain structure wide apart from each other, said elements being provided, in the outer part of their abutting faces, with notches located opposite each other, whereby the chain structure, when in line, is provided with cavities each extending on either side of the surface of junction of two adjoining elements, which cavities may be filled with the matter to be molded, while, when the chain is in a curved line, the two notches that form each cavity are moved apart from each other, whereby the molded products may leave the chain, rods for connecting the inward side plates of said sprocket chains respectively disposed in line with said studs, said rods extending only between the outer links of the chains.

4. In a continuous automatic molding machine of the type described, an endless chain structure comprising a plurality of elements adapted to fit against each other, inwardly extending lugs on the lateral ends of said elements, a sprocket chain on either side having each of its links secured to each of said lugs respectively disposed at a relatively great distance from the inner faces of the elements, whereby relative rotation of two adjacent links of the sprocket chain will bring the two corresponding elements of the endless chain structure wide apart from each other, said elements being provided in the outer part of their abutting faces with notches located opposite each other, whereby the chain structure, when in line, is provided with cavities each extending on either side of the surface of junction of two adjoining elements, which cavities may be filled with the matter to be molded, while when the chain is in a curved line the two notches that form each cavity are moved apart from each other whereby the molded products may leave the chain.

5. In a continuous automatic molding machine of the type described, an endless chain structure comprising a plurality of elements adapted to fit against each other, inwardly extending lugs on the lateral ends of said elements, a sprocket chain on either side having its links secured to said lugs respectively, disposed at a relatively great distance from the inner faces of said elements, whereby relative rotation of two adjacent links of the sprocket chain will bring the two corresponding elements of the endless chain structure wide apart from each other, said elements being provided in the outer part of their abutting faces with notches located opposite each other, whereby the chain structure, when in line, is provided with cavities each extending on either side of the surface of junction of two adjoining elements, which cavities may be filled with the matter to be molded, while when the chain is in a curved line the two notches that form each cavity are moved apart from each other whereby the molded products may leave the chain, said elements being further provided with recesses in the inner part of their abutting faces separated from the above mentioned cavities by very thin edges for preventing matter from accumulating in the interval located between two elements.

6. A continuous automatic molding machine of the type described comprising in combination an endless molding chain formed of a plurality of elements adapted to fit against each other, inwardly extending lugs on the lateral ends of said elements, so as to form two parallel series of lugs one on either side of the chain structure, two sprocket chains mounted inside said endless chain structure in parallel relation and close to said series of lugs respectively, having their links secured to said lugs respectively, and disposed at a relatively great distance from the inner faces of the elements, whereby relative rotation of two adjacent links of the sprocket chains will bring the two corresponding elements of the endless chain structure wide apart from each other, said elements being provided in the outer part of their abutting faces with notches located opposite each other so as to form molding cavities extending on either side of the surface of junction of two adjacent elements when the chain structure is in line, sprocket wheels adapted to engage said sprocket chain for supporting the endless molding chain, means for driving said sprocket wheels, combs adapted to remove the molded products that adhere to the upper notches of the molding cavities while the chain is passing over one sprocket wheel, and combs adapted to remove the molded products that adhere to the lower notches of the molding cavities while the chain is passing over one sprocket wheel.

7. A continuous automatic molding machine of the type described comprising in combination an endless molding chain formed of a plurality of elements adapted to fit against each other, inwardly extending lugs on the lateral ends of said elements, so as to form two parallel series of lugs one on either side of the endless chain structure, two sprocket chains mounted inside said endless chain structure in parallel relation and close to said series of lugs respectively, having their links secured to said lugs respectively, and disposed at a relatively great distance from the inner faces of the elements, whereby relative rotation of two adjacent links of the sprocket chains will bring the two corresponding elements of the endless chain structure wide apart from each other, said elements being provided in the outer part of their abutting faces with notches located opposite each other so as to form molding cavities extending on either side of the surface of junction of two adjacent elements when the chain structure is in line, sprocket wheels adapted to engage said sprocket chain for supporting the endless molding chain, means for driving said sprocket wheels, a crank disk, means for driving said disk, a rocking arm adapted to be operated by said crank disk, a comb slidably connected to said rocking-arm and a cam for controlling the sliding movement of said comb with respect to said rocking-arm, whereby the comb is caused to remove the molded product still adhering to the upper notches of molding cavities when the chain is passing over a sprocket wheel.

8. A continuous automatic molding machine of the type described comprising in combination an endless molding chain formed of a plurality of elements adapted to fit against each other, inwardly extending lugs on the lateral ends of said elements, so as to form two parallel series of lugs one on either side of the chain structure, two sprocket chains mounted inside said endless chain structure in parallel relation and close to said series of lugs respectively, having said links secured to said lugs respectively, and disposed at a relatively great distance from the inner faces of the elements, whereby relative rotation of two adjacent links of the sprocket chains will bring the two corresponding elements of the endless chain structure wide apart from each other, said elements being provided in the outer part of their abutting faces with notches located opposite each other so as to form molding cavities extending on either side of the surface of junction of two adjacent elements when the chain structure is in line, sprocket wheels adapted to engage said sprocket chain for supporting the endless molding chain, means for driving said sprocket wheels, rotary brushes having their axes at right angles to the plane of the elements for cleaning the molding cavities, other rotary brushes having their axes parallel to the elements for further cleaning said molding cavities, and sliding brushes adapted to move between the elements for cleaning the contiguous faces thereof.

9. A continuous automatic molding machine of the type described comprising in combination an endless molding chain formed of a plurality of elements adapted to fit against each other, inwardly extending lugs on the lateral ends of said elements, so as to form two parallel series of lugs one on either side of the chain structure, two sprocket chains mounted inside said endless chain structure in parallel relation and close to said series of lugs respectively, having their links secured to said lugs respectively, and disposed at a relatively great distance from the inner faces of the elements, whereby relative rotation of two adjacent links of the sprocket chains will bring the two corresponding elements of the endless chain structure wide apart from each other, said elements being provided in the outer part of their abutting faces with notches located opposite each other so as to form molding cavities extending on either side of the surface of junction of two adjacent elements when the chain structure is in line, sprocket wheels adapted to engage said sprocket chain for supporting the endless molding chain, means for driving said sprocket wheels, a sprocket chain disposed at a certain angle to the direction of travel of the molding chain and substantially parallel thereto and brushes mounted on said last mentioned sprocket chain adapted to engage the intervals between the elements of the chain for cleaning the contiguous faces of said elements.

10. A continuous automatic molding machine of the type described comprising in combination an endless molding chain formed of a plurality of elements adapted to fit against each other, inwardly extending lugs on the lateral ends of said elements, so as to form two parallel series of lugs one on either side of the chain structure, two sprocket chains mounted inside said endless chain structure in parallel relation and close to said series of lugs respectively, having their links secured to said lugs respectively, and disposed at a relatively great distance from the inner faces of the elements, whereby relative rotation of two adjacent links of the sprocket chains will bring the two corresponding elements of the endless chain structure wide apart from each other, said elements being provided in the outer part of their abutting faces with notches located opposite each other so as to form molding cavities extending on either side of the surface of junction of two adjacent elements when the chain structure is in line, sprocket wheels adapted to engage said sprocket chain for supporting the endless molding chain, means for driving said sprocket wheels, a sprocket chain disposed at a certain angle to the direction of travel of the molding chain and substantially parallel thereto brushes pivotally mounted on said last mentioned sprocket chain adapted to engage the intervals between the elements of the chain for cleaning the contiguous faces of said elements, and means for rotating said brushes for improving their cleaning action.

11. A continuous automatic molding machine of the type described comprising in combination an endless molding chain formed of a plurality of elements adapted to fit against each other, inwardly extending lugs on the lateral ends of said elements, so as to form two parallel series of lugs one on either side of the chain structure, two sprocket chains mounted inside said endless chain structure in parallel relation and close to said series of lugs respectively, having their links secured to said lugs respectively, and disposed at a relatively great distance from the inner faces of the elements, whereby relative rotation of two adjacent links of the sprocket chains will bring the two corresponding elements of the endless chain structure wide apart from each other, said elements being provided in the outer part of their abutting faces with notches located opposite each other so as to form molding cavities extending on either side of the surface of junction of two adjacent elements when the chain structure is in line, sprocket wheels adapted to engage said sprocket chain for supporting the endless molding chain, means for driving said sprocket wheels, a sprocket chain disposed at a certain angle to the direction of travel of the molding chain and substantially parallel thereto, brushes pivotally mounted on said last mentioned sprocket chain adapted to engage the intervals between the elements of the chain for cleaning the contiguous faces of said elements, a guide rail and a friction roller adapted to run on said rail for rotating said brushes.

12. A continuous automatic molding machine of the type described comprising in combination an endless molding chain formed of a plurality of elements adapted to fit against each other, inwardly extending lugs on the lateral ends of said elements, so as to form two parallel series of lugs one on either side of the chain structure, two sprocket chains mounted inside said endless chain structure in parallel relation and close to said series of lugs respectively, having their links secured to said lugs respectively, and disposed at a relatively great distance from the inner faces of the elements, whereby relative rotation of two adjacent links of the sprocket chains will bring the two corresponding elements of the endless chain structure wide apart from each other, said elements being provided in the outer part of their abutting faces with notches located opposite each other so as to form molding cavities extending on either side of the surface of junction of two adjacent elements when the chain structure is in line, sprocket wheels adapted to engage said sprocket chain for supporting the endless molding chain, means for driving said sprocket wheels, a feeding passage for leading the matter to the molding chain, two fluted rolls in said passage adapted to rotate in opposite directions and to cooperate with one another for leading the matter under pressure against the molding chain, and a smooth roller for striking off the surplus of matter fed to the molding chain.

13. A continuous automatic molding machine of the type described comprising in combination an endless molding chain formed of a plurality of elements adapted to fit against each other, inwardly extending lugs on the lateral ends of said elements, so as to form two parallel series of lugs one on either side of the chain structure, two sprocket chains mounted inside said endless chain structure in parallel relation and close to said series of lugs respectively, having their links secured to said lugs respectively, and disposed at a relatively great distance from the inner faces of the elements, whereby relative rotation of two adjacent links of the sprocket chains will bring the two corresponding elements of the endless chain structure wide apart from each other, said elements being provided in the outer part of their abutting faces with notches located opposite each other so as to form molding cavities extending on either side of the surface of junction of two adjacent elements when the chain structure is in line, sprocket wheels adapted to engage said sprocket chain for supporting the endless molding chain, means for driving said sprocket wheels, a hopper adapted to contain a powdered material located above said chain structure and provided with holes adapted to register with the molding cavities in the chain, and means operatively connected with the above mentioned means for driving the sprocket chain adapted to uncover said holes when a molding cavity is located immediately under a hole, so as to sprinkle said cavity with said powdered material in order to decrease the adherence of the molded products to the molding cavities.

14. In a continuous automatic molding machine of the type described, an endless chain structure comprising a plurality of elements adapted to fit against each other inwardly extending lugs on the lateral ends of said elements, a sprocket chain on either side having its links secured to said lugs respectively, disposed at a relatively great distance from the inner faces of said elements, whereby relative rotation of two adjacent links of the sprocket chain will bring the two corresponding elements of the endless chain structure wide apart from each other, said elements being provided with recesses in their outer faces extending along the whole length of one element and a part only of the two elements located on either side of the first mentioned one so as to form an elongated molding cavity when the chain structure is in line, and to be divided into three sections when the chain is in a curved line.

15. In a continuous automatic molding machine of the type described, an endless chain structure comprising a plurality of elements inwardly extending lugs on the lateral ends of said elements, a sprocket chain on either side having its links secured to said lugs respectively, disposed at a relatively great distance from the inner faces of said elements, whereby relative rotation of two adjacent links of the sprocket chain will bring the two corresponding elements of the endless chain structure wide apart from each other, said elements being provided with recesses in their outer faces extending along the whole length of one element, and a part only of the two elements located on either side of the first mentioned one, so as to form an elongated molding cavity when the chain structure is in line and to be divided into three sections when the chain is in a curved line, and a coating of a protective material applied on the inner walls of said recess.

In testimony whereof I have signed this specification.

ANDRÉ FAURE.